Oct. 12, 1965  E. A. STERN  3,211,152
SAFETY ENDOTRACHEAL TUBE CUFF
Filed Nov. 15, 1961  3 Sheets-Sheet 1
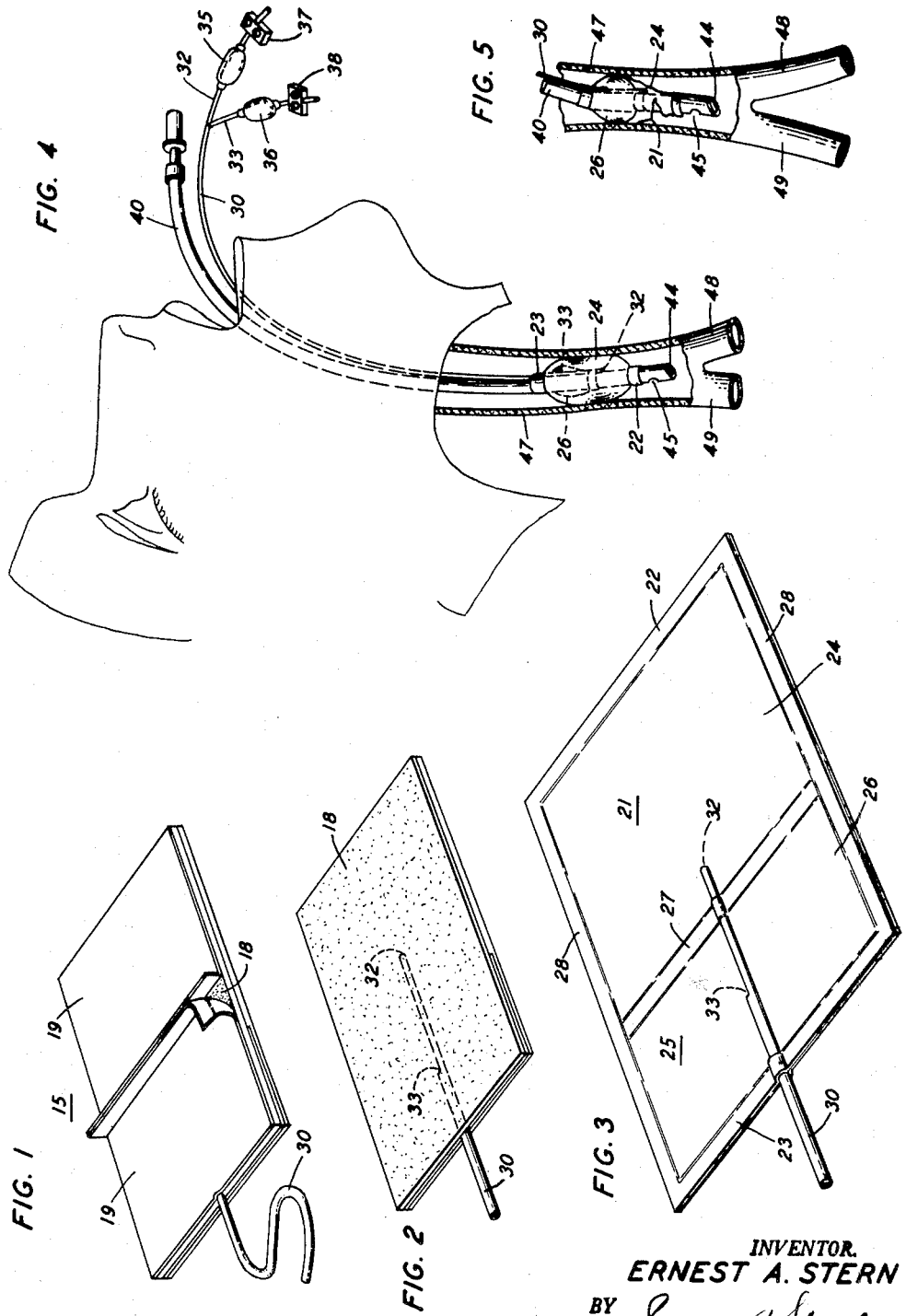
INVENTOR.
ERNEST A. STERN
BY
ATTORNEY Oct. 12, 1965  E. A. STERN  3,211,152
SAFETY ENDOTRACHEAL TUBE CUFF
Filed Nov. 15, 1961  3 Sheets-Sheet 2

INVENTOR.
ERNEST A. STERN
BY
ATTORNEY

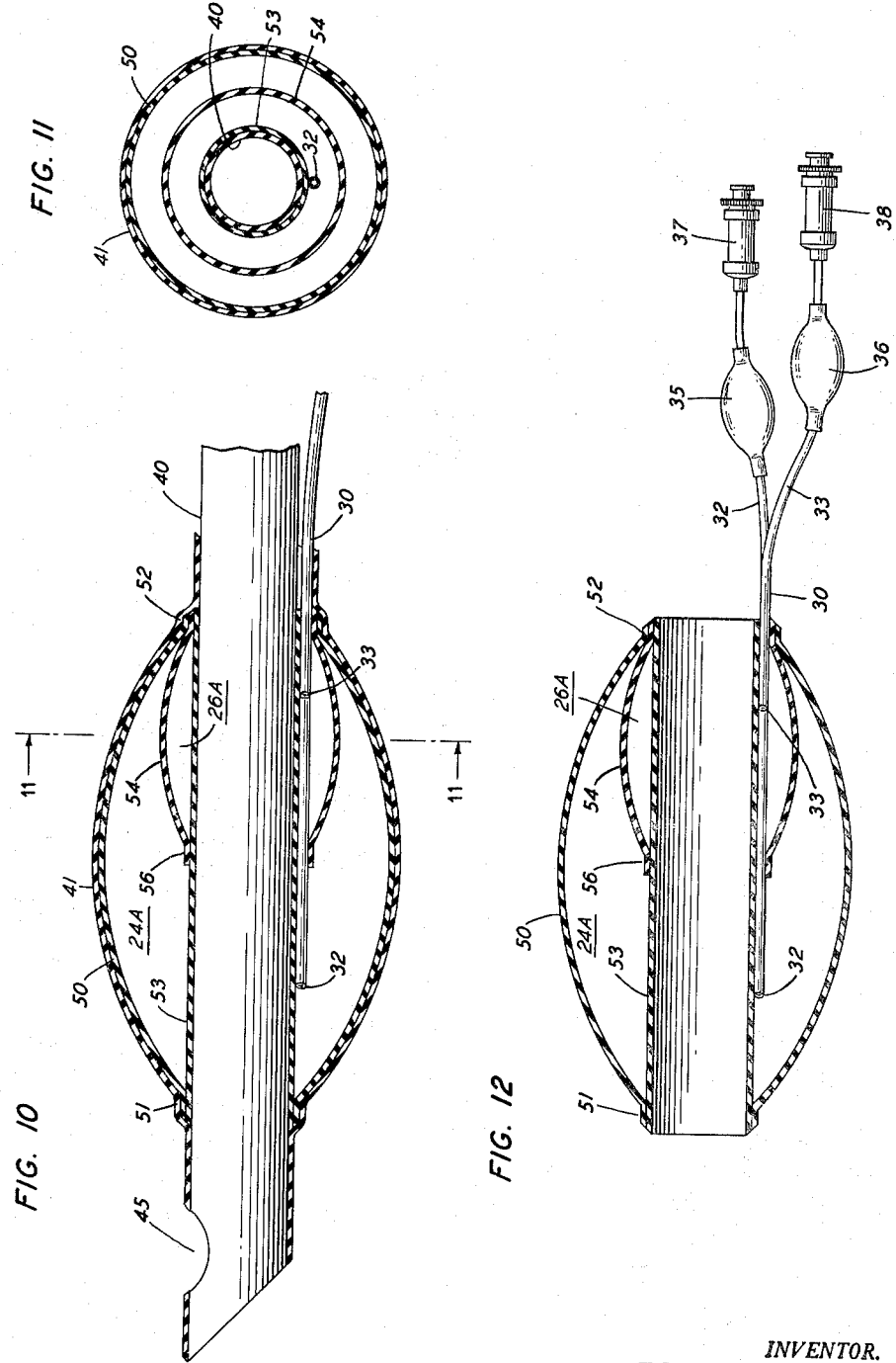

United States Patent Office 3,211,152
Patented Oct. 12, 1965

3,211,152
SAFETY ENDOTRACHEAL TUBE CUFF
Ernest A. Stern, 144—45 35th Ave., Flushing 54, N.Y.
Filed Nov. 15, 1961, Ser. No. 152,429
2 Claims. (Cl. 128—351)

The present application is a continuation-in-part of applicant's co-pending application Serial No. 757,810 filed August 28, 1958, now abandoned, entitled Safety Endotracheal Cuff.

This invention relates to endotracheal tubes for use in anesthesia and/or surgery.

Endotracheal tubes made from plastic or red rubber have heretofore been provided with an expansible bulb of flexible and extensible material such as india rubber surrounding the endotracheal tube adjacent the end thereof. The interior of the flexible bulb may be expanded by a flexible catherer of relatively small bore, through which air is passed into the bulb to inflate it tightly against the wall of the trachea in order to seal the same during anesthesia. In such endotracheal tubes with a single expansible bulb, the danger exists of cutting or rupturing with consequent deflation of the bulb during the course of surgery or anesthesia with possible danger to the patient. Collapse of the cuff in heart, or chest surgery may so endanger the oxygen supply as to threaten the patient's life. Delivery of oxygen or any anesthetic gas under pressure in the form of controlled, or assisted respiration may be impossible. Rupture of the cuff can lighten the anesthesia to a point where the patient could aspirate gastric or oral contents, or wake up during the operation. When explosive gases are used, it could precipitate an explosion.

An object of the invention is to provide an inflatable auxiliary bulb, for stand-by use and inflation in the event that the main bulb is cut or ruptured with consequent deflation thereof.

Another object of the invention is to provide an easily applied cuff with separately inflatable bulbs or air chambers for an endotracheal tube whereby two independently inflatable air chambers of differing lengths are provided, one within the other, whereby the shorter chamber may be inflated in case the longer main chamber is accidentally deflated by puncturing thereof during surgery, or being deflated spontaneously, due to herniation and/or rupture of a weak point of the wall of the chambers.

A feature of the invention is an endotracheal tube having two expansible bulbs or cuffs located upon its exterior adjacent one end, each bulb being connected to an inflatable detector or indicator, called "pilot balloons" attached to inflation catheters.

Another feature of the invention is an endotracheal tube having a pair of expansible cuffs or bulbs on its exterior, one thereof being considerably longer than the other, whereby the cutting or puncturing of both bulbs simultaneously is prevented to more than 50%, increasing thereby the safety of the device.

Another feature of the invention is a main sheet or a base sheet for wrap-around engagement around an endotracheal tube, to provide both the main compartment and a stand-by auxiliary compartment therein with a common wall fixed to the endotracheal tube by means of an adhesive surface. The auxiliary compartment is built on the same main or base sheet, and is of considerably shorter length and independently inflatable to preclude simultaneous rupture or puncture thereof.

All of the foregoing and still further objects and features of this invention will become apparent from a study of the following specifications taken in connection with the accompanying drawing, wherein:

FIGURE 1 is a perspective view of an endotracheal cuff in accordance with the present invention having a protective covering partly removed therefrom;

FIGURE 2 is a partial view of the cuff of FIGURE 1 illustrating the adhesive surface thereon which is the main sheet or base sheet common for both chambers, small and large.

FIGURE 3 is a perspective view of the endotracheal cuff showing the outside surface thereof or the opposite surface of FIGURE 2.

FIGURE 4 is a perspective view of the cuff shown in an operating position within the trachea or windpipe with the main compartment thereof inflated, the small emergency compartment deflated and showing the patient in supine position with head turned toward one side;

FIGURE 5 is a perspective view of the device shown in an operative position within the trachea with the main compartment punctured and the safety inner chamber inflated for emergency stand-by use.

FIGURE 10 shows a longitudinal section of a modification, illustrating an endotracheal tube with a seamless, double bulb construction having no overlap.

FIGURE 11 is a cross-section taken on line 11—11 of the device shown in FIGURE 10.

FIGURE 12 is a longitudinal view of an endotracheal cuff per se which can be slipped onto an endotracheal catheter by means of an instrument called a cuff spreader.

Figure 8:
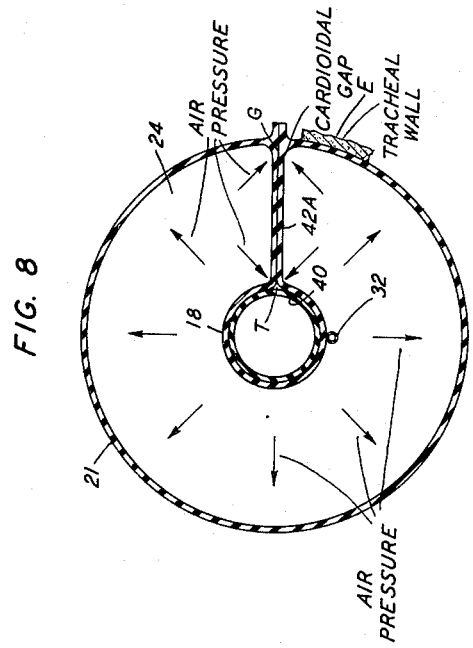
FIGURE 8 is a transverse cross sectional view taken along line 8—8 of FIGURE 6, showing the overlap of the suff as part of the main or base sheet, which is cemented and wrapped around the endotracheal tube and meets with its seams forming the overlap.

Referring now to the drawings, and more particularly to FIGURES 1 to 3 thereof, the safety endotracheal cuff 15 includes a base sheet 18 which mounted on the endotracheal tube by being wrapped longitudinally therearound remains fixed, having a layer of adhesive coating thereon. Before application, the adhesive surface is protected by means of a pair of removable paper tabs 19 which are readily separable therefrom when preparing the assembly for use.

Base sheet 18 is generally rectangular in shape, and superimposed upon it is another generally rectangular sheet 21 co-extensive therewith. The two sheets are secured to each other along their respective edges by means of seals or seams 22, 23 and 28. Between base sheet 18 and sheet 21 is a generally rectangular sheet 25 approximately half the length of the other two sheets. The side edges of sheet 25 are secured by means of seals 23, 27 and 28 to the base sheet and by means of said seals 23 and 28 to sheet 21. A main air chamber or compartment 24 is formed between sheets 18 and 21; an auxiliary air chamber or compartment is formed between sheets 18 and 25. A double channel inflation catheter tube 30 is secured to the sheet 18, the seams 23, 27 and sealed in hermetically as shown in FIGURE 3. The sheets 18 and 21, 25 may be made of fine elastic india rubber.

The seams or seals 22, 23, 27 and the longitudinal seams 28 of the overlap may be completely insured against air leaks by rubber cement. This will prevent air leakage from the inflated bulbs or compartments from causing deflation of the same during surgical procedure with a consequent loss of anesthetic gas or oxygen from the same cause.

The flat main flexible sheet 21 shown in FIGURE 3 is the outer wall of the large inflatable compartment 24 and is connected at opposite ends by means of seals 22, 23 and with the longitudinal seals 28 forming the overlap to the base sheet 18 to define a main compartment 24 therewith.

Referring to FIGURE 4, the inflation catheter 30 includes a pair of substantially identical air ducts or conduits 32, 33, one conduit 32 communicating at one end with the interior of the main compartment 24, and the other conduit 33 independently communicating at one end with the interior of the auxiliary compartment 26. The outer ends of both of these conduits 32, 33 are provided with pilot balloons 35, 36 that provide a visual indication of the condition of the main and auxiliary compartments 24, 26. Individual clamps 37, 38 carried by each of the conduits 32, 33 provide an effective seal for preventing the escape of air through the conduits relative to the compartments 24, 26.

In actual use, the paper tabs 19 are removed from the adhesive surface of the base sheet 18 and the base sheet is wrapped around the endotracheal tube 40 with the longitudinal ends thereof in overlapping engagement to provide a seam 42A (FIGURES 8 and 9) that will prevent separation of the cuff assembly from the endotracheal tube. This assembly is secured upon the endotracheal catheter 40 immediately adjacent to the open tip 44 and a side passageway port 45, prior to insertion of the endotracheal tube into the trachea 47 of the patient to a point adjacent to the right and left bronchus 48, 49.

It will now be apparent that the outer end of one conduit 32 is connected to a source of air pressure to inflate the main compartment 24 of the cuff assembly. In the event that the main compartment 24 is perforated by the surgical knife or spontaneously during an operation, it is then only necessary to connect the other conduit 33 to a source of air pressure to inflate the safety auxiliary compartment 26 against the tracheal wall whereby the surgery can continue without interruption and without endangering the patient's safety and life.

The trachea has an ability to change is outer and inner diameter in response to various nervous or mechanical stimuli, for example, inflation of the cuff and contact of same with the tracheal tissues. These phenomena are called broncho-constriction and broncho-dilatation respectively. These phenomena are regulated by nervous pathways, which are able to cause constriction or dilatation. The same phenomenon is known to effect not only the bronchi of large calibre but also the smaller bronchioles and here it is called bronchiolar constriction or dilatation respectively. The same phenomena apply to the trachea, so that there is also tracheal spasm or tracheal relaxation. A second factor which must be considered here is the inner lining of the trachea called the mucosa. This mucosa consists of several layers and being soft tissue will adjust itself and adhere to the inflated cuffs or bulbs. This mucosa is covered with a gelatinous like material called mucus. This mucus would cause a sealing action between the wall of the bulbs and the trachea.

The third factor to be considered in the way of eliminating a possible cardioid shape of the cuff would be the fact that there is air under pressure in the cuff, as shown by the arrows in FIGURE 8 which will have a tendency to bring the outer free layer 21 of the cuff as close to the tracheal lining as humanly possible, depending on how much air pressure is present in the inflated cuff. With greater air pressures in the cuff the tendency will be for the cuff to adhere firmly to the inner lining of the trachea and eliminate any possible undesirable cardioid gap.

Ordinarily, the use of an endotracheal cuff during surgical procedures prevents many hazards that can result in death or serious damage in the event that such cuff becomes accidentally, or otherwise, perforated, e.g. by the surgeon's knife or other sharp instrument coming into contact therewith. Such danger results from the difficulty of an immediate replacement of such perforated cuff due to the sterile operative field, mainly in operations upon the brain or the neck, and from prevention of maintenance of a tight airway to the lungs, due to loss of a closed and tight anesthesia circuit, as well as maintenance of positive oxygen pressure, so vitally important in any cardio-vascular or pulmonary stress. In addition, the entry of any foreign matter, like blood, saliva, or contaminated stomach content, into the lungs, due to a ruptured cuff, presents additional hazards that can also result in serious damage or death. By means of using this emergency endotracheal cuff, the danger of interruption of the administration of positive oxygen pressure in cardiovascular, and pulmonary stress, and death in such cases, can be prevented. In these cases, the safety cuff is life-saving.

Figure 6:
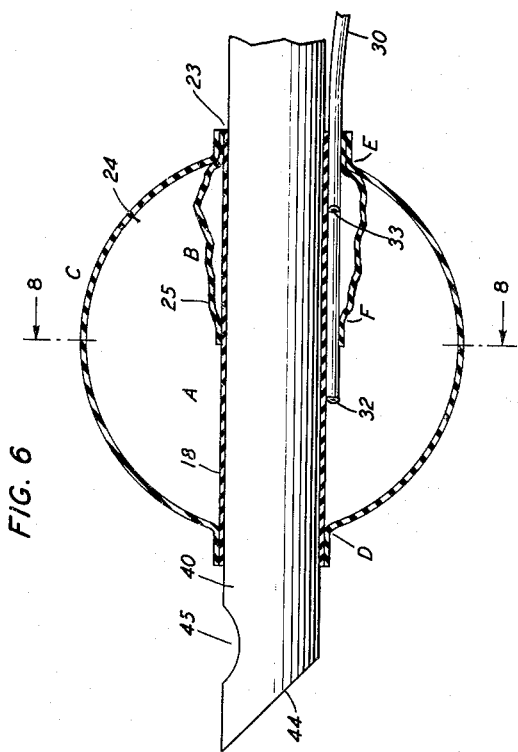
FIGURE 6 is an enlarged side view of FIGURE 4, showing a longitudinal section view of both cuffs illustrating the main compartment inflated in use, while the safety inner compartment is in the deflated state.

FIGURE 6 illustrates an enlarged view of the catheter 40, showing the main compartment 24 inflated through the fine tubular conduit 32 and the stand-by compartment 26 in deflated condition.

As illustrated in FIGURES 4, 5, 6 and 7, an important feature in accordance with the invention is the different size of the cuffs. The inner cuff or compartment 26 is considerably shorter in length than the main compartment 24.

Should the larger compartment 24 be accidentally punctured during a surgical operation, it is unlikely that the auxiliary compartment will be simultaneously similarly affected, being considerably smaller located in the upper or lower portion of the main chamber, i.e. closer or further from the tip 44 of the endotracheal tube, and always deflated, until put in actual use and inflated. Thus, it is more remote from mechanical damage. It is also protected at all times by the wall 21 of the large or main compartment even after puncture of the same, being covered around by the same. Therefore, the intact stand-by compartment will be available for emergency inflation from duct 33, to expand against the trachea and tracheal tissues, and close again the circuit of anesthetic gases and oxygen so badly needed by the patient.

Figure 7:
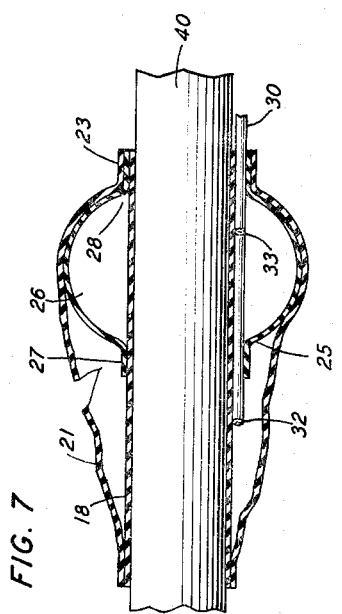
FIGURE 7 is an enlarged longitudinal view of the structure shown in FIGURE 5, with the large main compartment punctured and the shorter inner emergency compartment inflated.

FIGURE 7 illustrates an enlarged view of the catheter 40 showing the main sheet 21 punctured and the safety auxiliary compartment 26 inflated.

Figure 9:
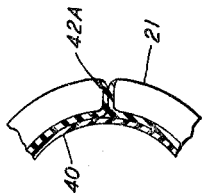
FIGURE 9 is an enlarged view of the overlap shown in FIGURE 8.

FIGURE 8, which is a cross-section of FIGURE 6 on line 8—8, illustrates the overlap of the longitudinal cuff seams 42A of FIGURES 8 and 9 or the corresponding seams 28 shown in FIGURE 3. The arrows shown in FIGURE 8 indicate the air pressures operating in the main compartment 24 when the main flexible sheet 21 is inflated.

With respect to FIGURE 8 and the overlap, note point T and G at which the air pressure in the inflated main compartment 24 and at point G the close adaptation of the wall of the trachea E must close any possible gap of the inflated main chamber wall 21.

As heretofore described, the invention broadly is not only applicable to the wrap-around, flat sheet, form of endotracheal cuff shown in FIGURES 1–6, but also to a double, spherical bulb arrangement concentrically disposed about the endotracheal tube, one bulb being shorter in length than the other, as illustrated in FIGURES 10–12.

As shown in FIGURES 10 and 11, the larger expansible sheet 50 is secured at one end 51 and at the other end 52 to the base or main sheet 53 fitted upon the endotracheal tube 40. The flexible sheet of the smaller inner bulb 54 is also secured at 52 to the outer bulb 50 and base or main sheet 53 at one end thereof with its inner end 56 secured to an intermediate portion of the base sheet 53. The air inflation ducts 30, 32 and 33 enter the bulbs 24A and 26A respectively, as indicated previously.

The bulbs 24A, 26A and base sheet 53 are made of flexible, elastic material such as fine red rubber, which is also true of the sheets 18, 21, 25 heretofore described (FIGS. 1–3). The shape of bulbs 24A and 26A of FIGS. 10 and 11 is round and seamless, expanding under inflation into true spherical or globular form, but the base sheet 53 is permanently secured upon catheter 40, being an integral part thereof.

It is within the purview of the invention as illustrated in FIGURE 10 to provide an integral arrangement of the endotracheal tube 40 with the bulbs 24A, 26A and base sheet 53 integral therewith. The integral ararngement is then dipped into a bath of liquid rubber, which dries to fully seal the endotracheal construction of FIGURE 10 hermetically and to cause the thin cylindrical tubules 30 to adhere to the endotracheal tube 40, which is made of india rubber, plastic or the like. When the liquid rubber is fully dry, a coating 41 of fine elastic india rubber is present as a hermetic seal over the integral arrangement of endotracheal tube 40 and bulbs 24A, 26A in the manner illustrated in FIGURE 10.

Referring to FIGURE 12, there is provided a cuff or bulb structure which as a whole is adapted to be slipped onto an endotracheal catheter, to be removable and replaceable when worn out or ruptured. This unit is also made of rubber of fine elastic quality, such as india rubber, including the inflation duct 39.

It should be particularly noted that for each form of FIGURES 10–12 a large bulb is attached at the ends to the endotracheal tube 40 and to a base sheet 53 thereon, while a smaller inner bulb is attached at one end of the larger bulb to the same endotracheal tube and base sheet. The other or inner end of the smaller bulb may also be independently attached to an intermediate portion of the endotracheal tube and base sheet.

This arrangement protects the smaller bulb so that it can form an emergency auxiliary bulb to fall back upon should the large bulb be accidentally cut or ruptured during an operation. Likewise, the smaller inner bulb may also be mounted entirely upon an intermediate portion of the endotracheal tube and base sheet thereon, midway between the ends of the larger bulb, or at the opposite end position with respect to FIGURES 10–12, with one end attached at 51 and the other end at 56, all within the purview of the invention.

Cylindrical one-way air valves 37, 38 are fastened to the free ends of the tubules respectively as shown in FIG. 12 to maintain them in the inflated state as well as the expandable bulbs 24A, 26A by preventing the escape of air due to the one-way flow arrangement.

While in the foregoing description, reference has been made to various embodiments illustrating the invention, it should be apparent to those skilled in the art that various other embodiments may be devised without departing from the spirit and scope of the invention.

What is claimed is:

1. An endotracheal cuff comprising a generally rectangular rubber base sheet having adhesive attaching means on one side surface thereof for attachment to and around an endotracheal tube, an outer generally rectangular rubber sheet coextensive with the base sheet and overlying the opposite side surface of said base sheet, said base and outer sheets being secured to each other along all of their respective side edges to form a main air chamber between them, an intermediate generally rectangular rubber sheet approximately half the length of the base and outer sheets, mounted between said base and outer sheets at one end thereof, all of the side edges of said intermediate sheet being secured to said base sheet to form an auxiliary air chamber between them, a first catheter connected between the base and outer sheets and communicating with the main air chamber between them to inflate said main chamber, and a second catheter connected between said base and intermediate sheets and communicating with said auxiliary air chamber to inflate said auxiliary chamber.

2. An endotracheal cuff in accordance with claim 1, wherein pilot balloons are provided in the catheters to serve as inflation indicators with respect to said main and auxiliary air chambers.

References Cited by the Examiner

UNITED STATES PATENTS 2,687,131    8/54    Raiche _____ 128—349
2,792,837    5/57    Kardos _____ 128—351

FOREIGN PATENTS 693,510    7/53    Great Britain.
758,357    11/33    France.

RICHARD A. GAUDET, *Primary Examiner.*

JORDAN FRANKLIN, *Examiner.*